United States Patent
Chiu et al.

(10) Patent No.: US 7,414,216 B2
(45) Date of Patent: Aug. 19, 2008

(54) TOUCHING RIB OF INPUT UNIT AND MOLD THEREOF

(75) Inventors: Meng-Chang Chiu, Hsinchu (TW); Chi-Chih Tseng, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 197 days.

(21) Appl. No.: 11/271,782

(22) Filed: Nov. 14, 2005

(65) Prior Publication Data

US 2006/0152481 A1   Jul. 13, 2006

(30) Foreign Application Priority Data

Jan. 7, 2005   (TW) .............................. 94100527 A

(51) Int. Cl.
*H01H 13/14* (2006.01)

(52) U.S. Cl. ...................... 200/520; 200/314

(58) Field of Classification Search ......... 200/310–314, 200/341–345, 512–520
See application file for complete search history.

(56) References Cited

U.S. PATENT DOCUMENTS

| | | | |
|---|---|---|---|
| 4,123,641 A * | 10/1978 | Murata | 200/345 |
| 5,045,656 A * | 9/1991 | Kojima | 200/314 |
| 5,889,242 A * | 3/1999 | Ishihara et al. | 200/6 A |
| 6,271,491 B1 * | 8/2001 | Ono et al. | 200/520 |
| 6,399,904 B1 * | 6/2002 | Mimata | 200/6 A |
| 6,653,579 B2 * | 11/2003 | Inoue et al. | 200/6 A |
| 6,713,692 B2 * | 3/2004 | Yamasaki | 200/6 A |
| 6,784,382 B2 * | 8/2004 | Yanai et al. | 200/1 B |

FOREIGN PATENT DOCUMENTS

DE   4123641 A1 *   1/1993

\* cited by examiner

*Primary Examiner*—Michael A Friedhfoer
*Assistant Examiner*—Lisa N Klaus
(74) *Attorney, Agent, or Firm*—Troxell Law Office, PLLC

(57) ABSTRACT

A touching rib of an input unit is provided. The input unit comprises the touching rib and a pressing portion including a top face and a bottom face. The present touching rib comprises a main body and at least one auxiliary structure. The main body is disposed on the bottom face for touching an electronic switch in a predetermined distance. The main body has a first predetermined height. The auxiliary structure is formed integrally with the main body and disposed on the bottom face and side by side with the main body. The auxiliary structure has a second predetermined height shorter than the first predetermined height. The auxiliary structure is needed for maintaining the main body having an accurate height, which is corresponding to the first predetermined height, and a smooth surface for touching the electronic surface.

10 Claims, 7 Drawing Sheets

TOUCHING RIB OF INPUT UNIT AND MOLD THEREOF

BACKGROUND OF THE INVENTION (1) Field of the Invention

The present invention generally relates to an interior structure of an input device, which comprises at least one input unit, and particularly to a touching rib of the input unit.

(2) Description of the Prior Art

Among many kinds of electronic devices, an input device is needed for operating these device or for inputting commands or information into these devices. For example, input device such as keyboard comprises many keys. These keys are the mentioned input units. Typically, the input unit comprises a touching rib for touching an electronic switch of a electronic device.

Please refer to FIG. 1. FIG. 1 shows the bottom of a prior input unit 2. The input unit 2 comprises a pressing portion 3 and a touching rib 4. The pressing portion 3 comprises a top face 31 and a bottom face 32. The touching rib 4 is disposed on the bottom face 32. An user can press the top face 31 of the input unit 2 so as to touch an electronic switch (not shown) of an electronic device by the touching rib 4. The electronic switch is usually electrically connected with a circuit of the electronic device. For example, some typical electronic switch is directly mounted on a printed circuit board (PCB) and electrically connected with it.

As to the fabrication method of the prior input unit 2, a mold 10 shown in FIG. 2 is utilized for filling plastic materials to form the input unit 2. The mold 10 has a cavity 12 corresponding to the shape of the input unit 2. The cavity 12 can be divided into a first portion 13 and a second portion 14, which have corresponding shapes to the pressing portion 3 and the touching rib 4, respectively. As shown in FIG. 2, the second portion 14 of the cavity 12 has a shape of cross corresponding to the touching rib 4 shown in FIG. 1.

In one typical prior art, the whole cavity 12 is formed by an electric discharge machining (EDM) process toward the material of the mold 10. Hence, the cavity 12 is airtight except for the opening for filling the plastic materials. While filling the plastic materials of the input unit 2 into the cavity 12, bubbles may be formed at the interface between the mold 10 and the plastic materials. If these bubbles are formed at the bottom of the second portion 14 of the cavity 12, it may cause the formed touching rib 4 shorter than a predetermined height. In some worse situation, the shortened touching rib 4 is not able to touch the electronic switch and loses its predetermined function.

Please refer to FIG. 3. FIG. 3 shows another prior mold for fabricating the input unit. For resolving the mentioned problem of bubbles, another prior mold 20 is provided. The second portion 24 of the cavity 22, which is needed for forming the touching rib 4, is ventilative in this prior art. While filling the plastic materials of the input unit 2 into the cavity 22, an inlay 26 is disposed at the bottom of the second portion 24 of the cavity 22 to jointing with the mold 20. There is a plurality of micro-chinks between the inlay 26 and the mold 20 so as to allow air, which is formed between the plastic materials of the input unit 2 and the inlay 26, to flow out. By this inlay 26, the mention problems of bubbles and the shortened touching rib 4 is somehow resolved.

However, another problem is aroused because of using the inlay 26. While filling plastic materials into the cavity 22 shown in FIG. 3, not only air can flow through the micro-chinks between the inlay 26 and the mold 20, some plastic materials flow into these micro-chinks either. Although the amount of the plastic materials flowing into the micro-chinks is very limited, roughness structures such as fibers can readily be formed on the surface of the touching rib 4. The roughness surface or a too long height may frustrate the predetermined function of the touching rib 4.

As described above, while the input unit is elementary to many kinds of input devices. An input unit without the foregoing drawbacks is therefore needed. There are demands to provide a method for fabricating a input unit comprising a touching rib with a smooth surface and an accurate height corresponding to its predetermined design.

SUMMARY OF THE INVENTION

One objective of the present invention is to provide an input unit comprising a touching rib with an accurate height corresponding to its predetermined design.

Another objective of the present invention is to provide a an input unit comprising a touching rib with a smooth surface for touching an electronic switch.

A touching rib of an input unit is provided. The input unit comprises the touching rib and a pressing portion including a top face and a bottom face. The present touching rib comprises a main body and at least one auxiliary structure. The main body is disposed on the bottom face for touching an electronic switch in a predetermined distance. The main body has a first predetermined height. The auxiliary structure is formed integrally with the main body and disposed on the bottom face and side by side with the main body. The auxiliary structure has a second predetermined height shorter than the first predetermined height. The auxiliary structure is needed for maintaining the main body having an accurate height, which is corresponding to the first predetermined height, and a smooth surface for touching the electronic surface.

The advantage and spirit of the invention may be understood by the following recitations together with the appended drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
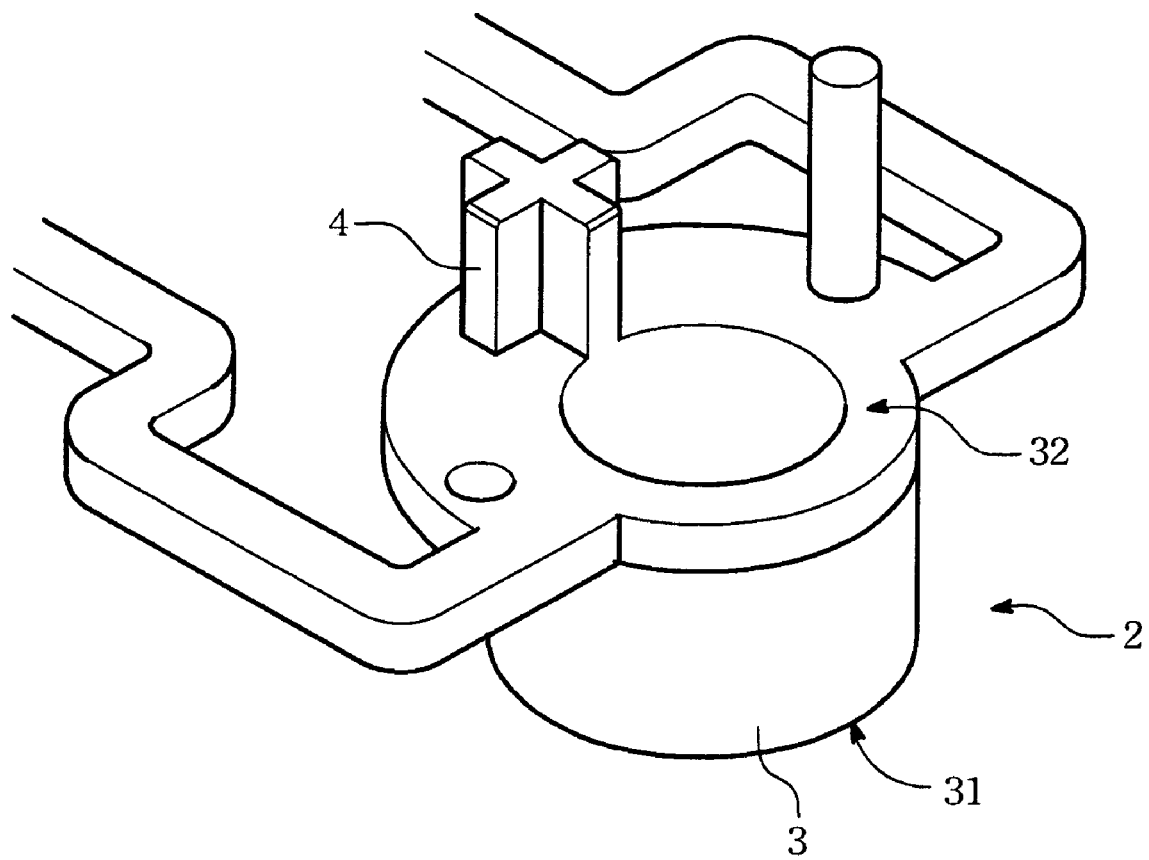
FIG. 1 shows the bottom of a prior input unit.
Figure 2:
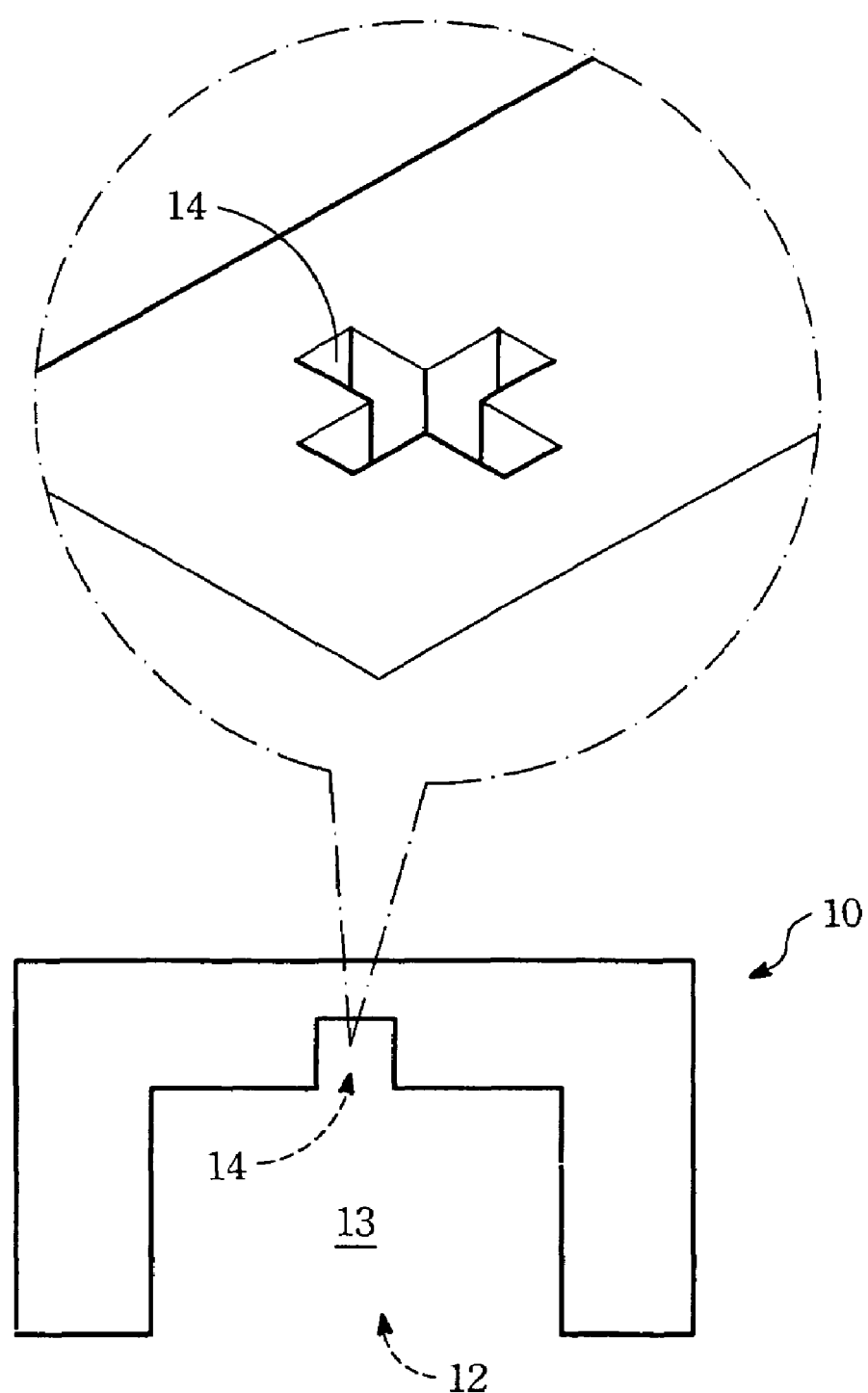
FIG. 2 shows a prior mold utilized for fabricating the input unit of FIG. 1.
Figure 3:
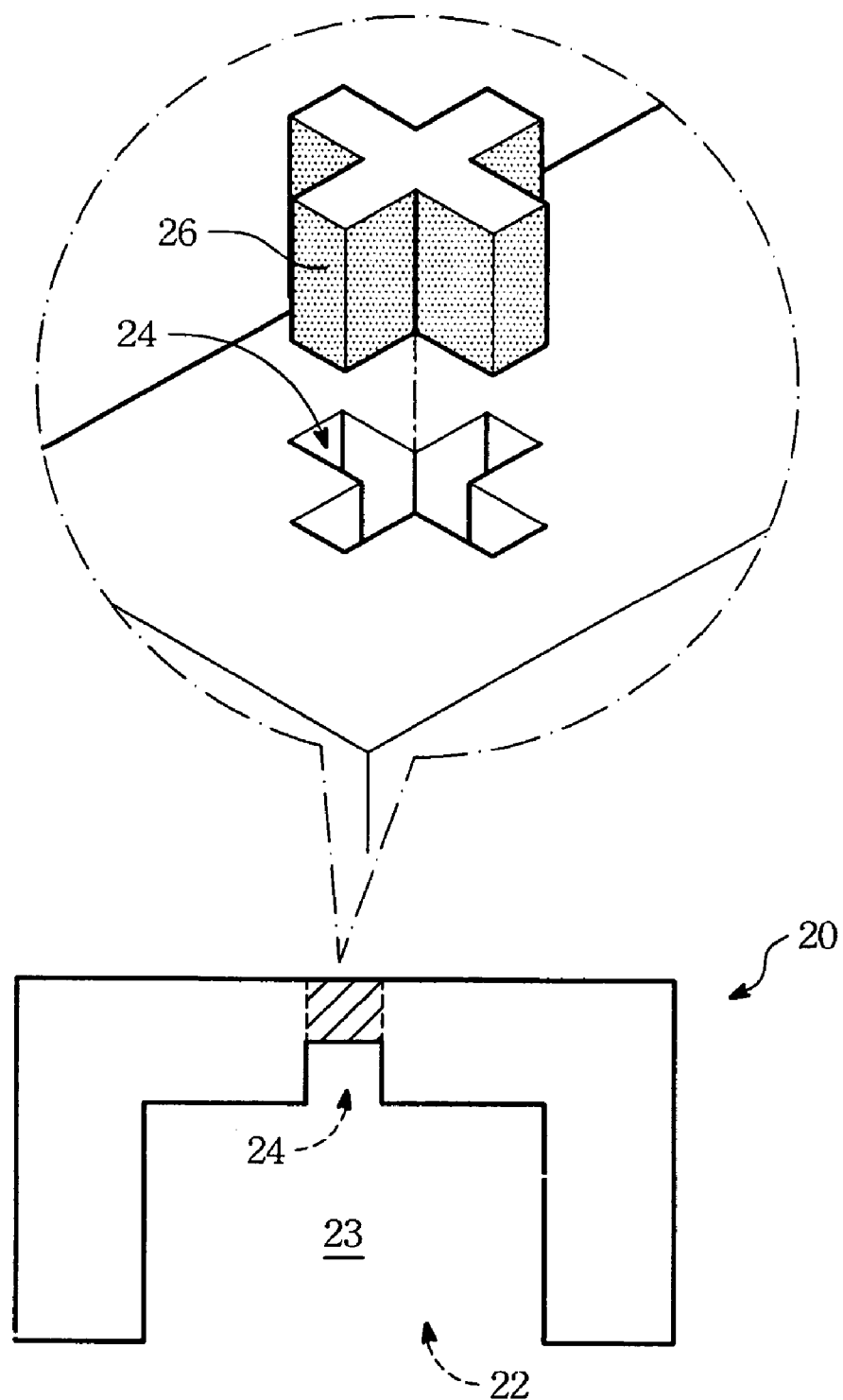
FIG. 3 shows another prior mold for fabricating the input unit of FIG. 1.
Figure 4:
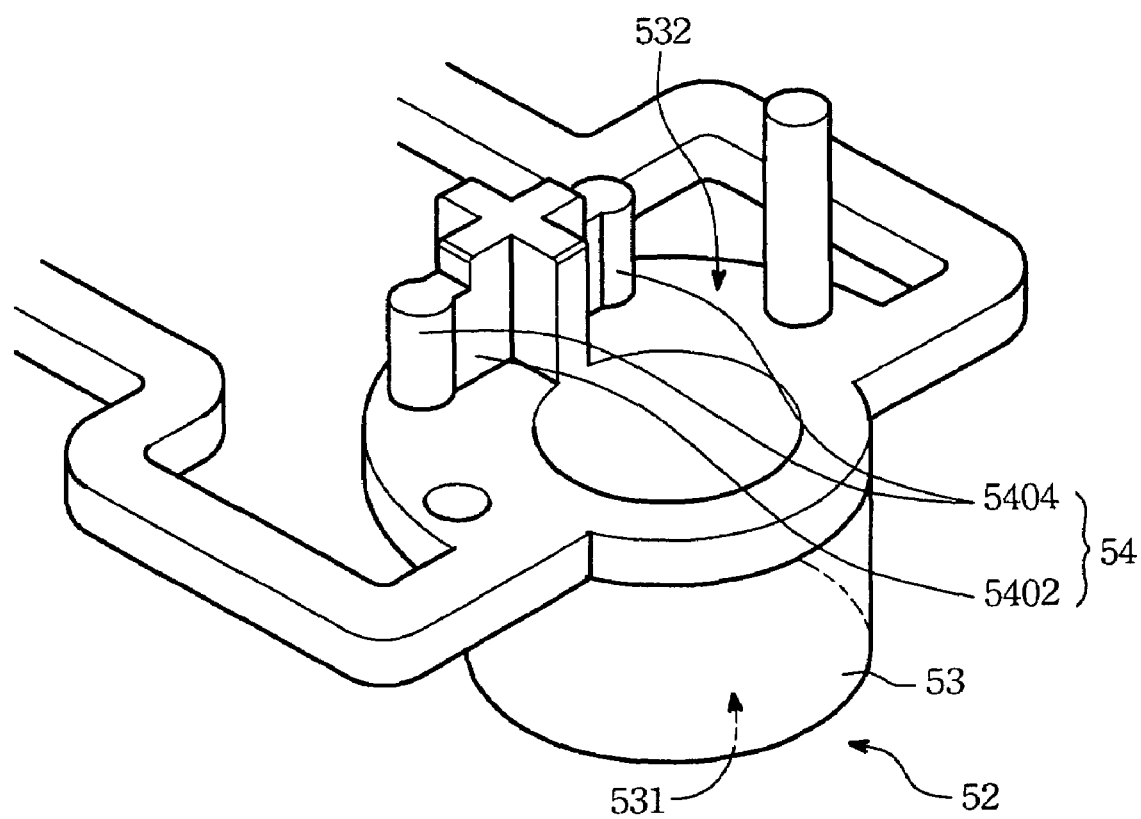
FIG. 4 shows the bottom of a present input unit.
Figure 5:
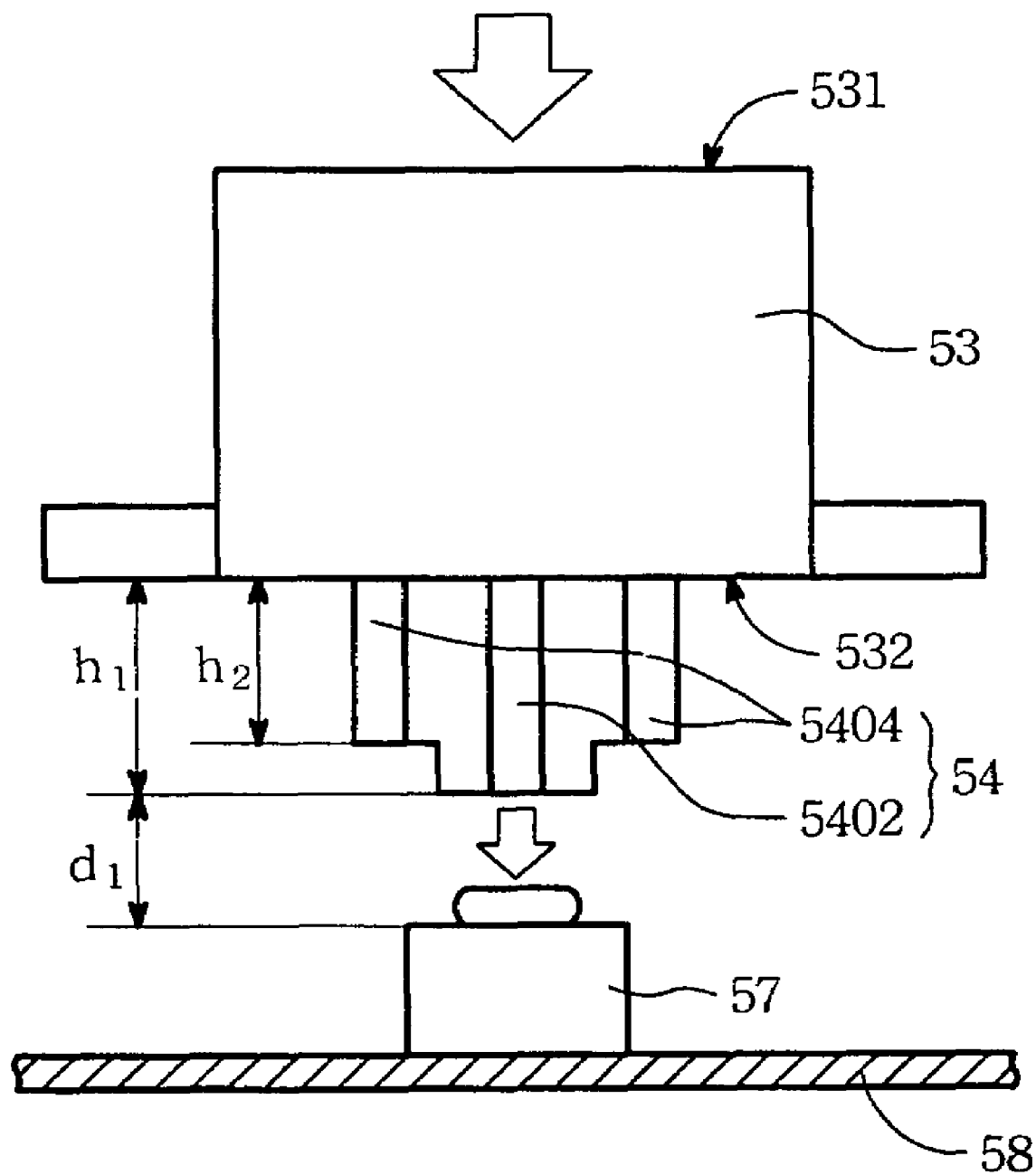
FIG. 5 shows a cross-section view of the input unit shown in FIG. 4.

Please refer to FIG. 4 and FIG. 5. FIG. 4 shows the bottom of a present input unit 52. FIG. 5 shows a cross-section view of the input unit 52 shown in FIG. 4. The input unit 52 comprises a pressing portion 53 and a touching rib 54. The pressing portion 53 comprises a top face 531 and a bottom face 532. The touching rib 54 is disposed on the bottom face 532. An user can press the top face 531 of the input unit 52 so as to touch an electronic switch 57 of an electronic device (not shown) by the touching rib 54. There is a predetermined distance (d1) between the input unit 52 and the electronic switch 57.

The electronic switch 57 is electrically connected with a circuit of the electronic device. In one embodiment of the present invention, the electronic switch 57 is directly mounted on a printed circuit board (PCB) 58 and electrically connected with it.

The present touching rib 54 comprises a main body 5402 and at least one auxiliary structure 5404. The main body 5402 and the auxiliary structure 5404 are formed integrally and disposed side by side on the bottom face 532 of the pressing portion 53. In the embodiment according to FIG. 4, a cross section of the main body 5402 has a shape of cross (+); and the auxiliary structure 5404 has a shape of column. As shown in FIG. 5, the main body 5402 has a first predetermined height (h1), and the auxiliary structure 5404 has a second predetermined height (h2). The second predetermined height (h2) is shorter than the first predetermined height (h1). One major function of the auxiliary structure 5404 is to keep the height of the main body 5402 from changing from the first predetermined height (h1) during the fabrication process.

Figure 6:
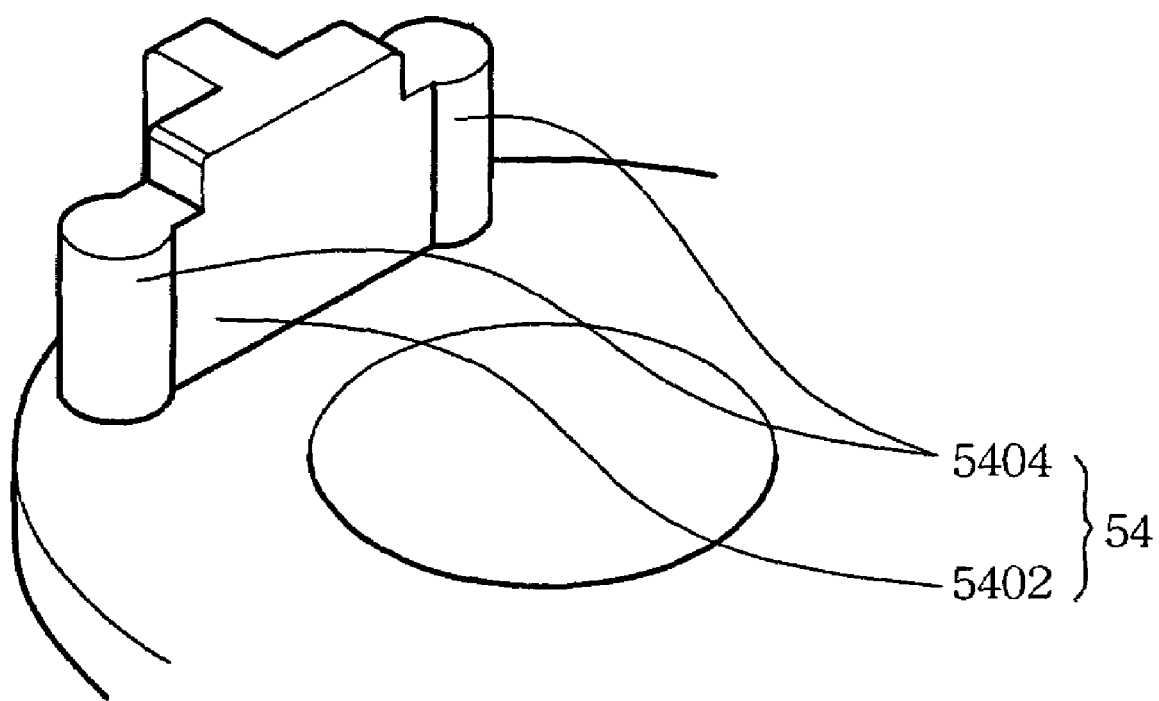
FIG. 6 shows another embodiment of the present invention.

FIG. 6 shows another embodiment of the present invention. In this embodiment, a cross section of the main body 5402 has a shape of T, which is different from the embodiment according to FIG. 4. The main body 5402, or even the auxiliary structure 5404, may be embodied in many kinds of un-shown shapes. But according to the present invention, the second predetermined height (h2) of the auxiliary structure 5404 has to be shorter than the first predetermined height (h1) of the main body 5402.

Figure 7:
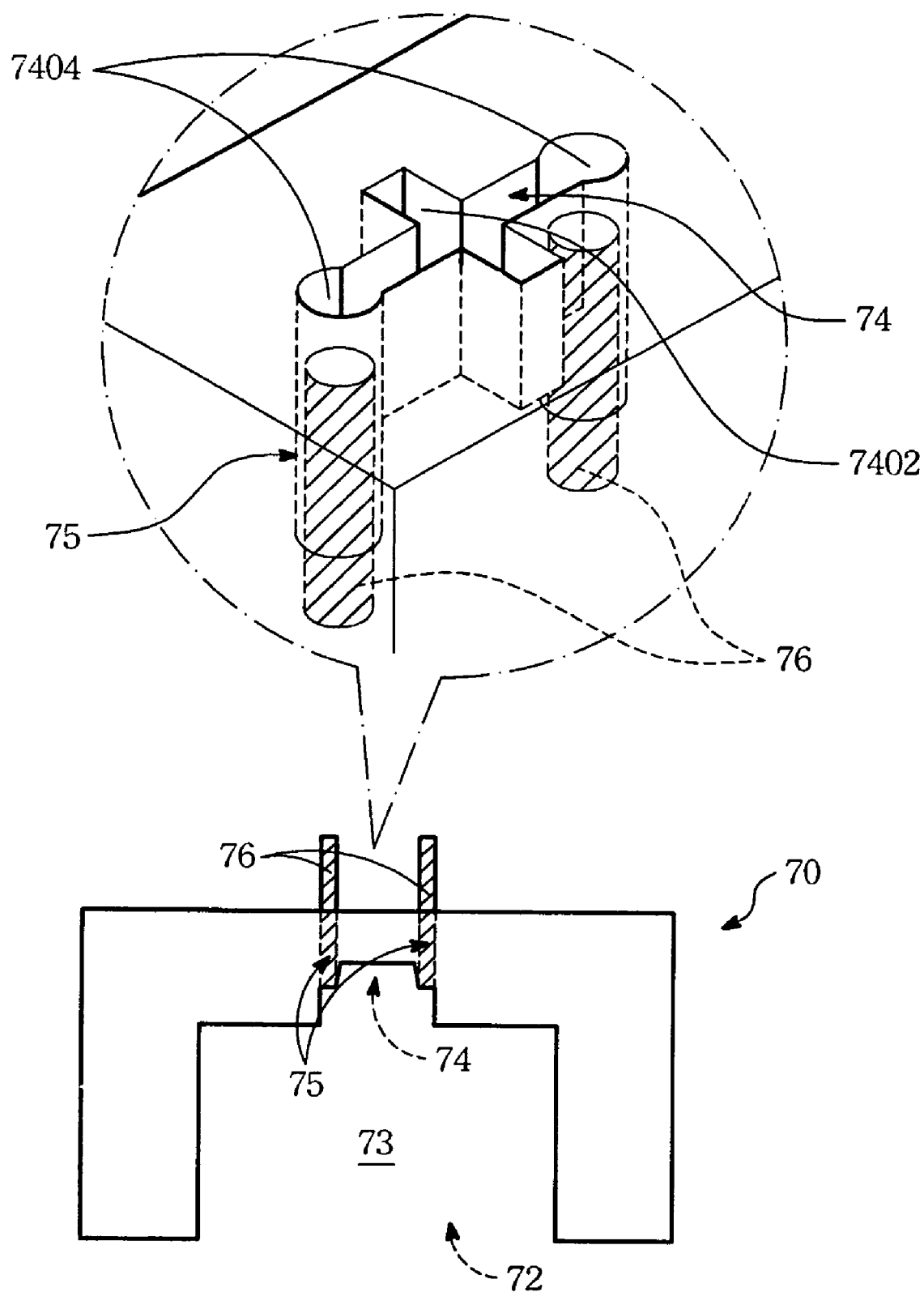
FIG. 7 shows a mold utilized for fabricating the present input unit.

As to the fabrication method of the present input unit 52, a mold 70 shown in FIG. 7 is utilized for filling plastic materials to form the input unit 52. The mold 70 has a cavity 72 corresponding to the shape of the input unit 52. The cavity 72 can be divided into a first portion 73 and a second portion 74, which in order have corresponding shapes to the pressing portion 53 and the touching rib 54. As shown in FIG. 7, the second portion 74 can be divided into a cross-shaped hollow 7402 and two column-shaped hollows 7404. The column-shaped hollows 7404, which are corresponding to the auxiliary structure 3204 of FIG. 4, are shallower than the cross-shaped hollow 7402.

As shown in FIG. 7, two inlays 76 are disposed in corresponding through holes 75 to joint with the mold 70. The through hole 75 is directly connected with the column-shaped hollow 7404, therefore the bottom of the second portion 74 of the cavity 72 is opened by the through hole 75 at the column-shaped hollow 7404. The through hole 75 is formed by an EDM process, such as a wire EDM machining. While filling the plastic material of the input unit 52 into the cave 72, air within the cavity 72 can be removed through the micro-chinks between the mold 70 and the inlay 76. As a result, please refer to FIG. 4, even if roughness structures such as fibers are formed on the surface of the auxiliary structure 5404, the main body 5402 of the touching rib 54 is able to maintain a flat surface. Further more, even if the actual height of the auxiliary structure 5404 may change because of using the inlay 76, the height of the main body 5402 can always accurately meet the first predetermined height h1. So the predetermined distance (d1) between the input unit 52 and the electronic switch 57 is able to be maintained in every product.

In other embodiments of the present invention, a pin, such as a metal needle, is selected for the inlay 76. A gap between the inlay 76 and the through hole 75 can be used to exhaust the air between the mold 70 and the injecting plastic material. As a result, these embodiments have the same advantages, such as maintaining the predetermined distance (d1) and maintaining the surface flatness of the main body 5402, as the pre-described embodiments.

Accordingly, the prior drawbacks of the input unit are resolved in the present invention. An input unit comprising a touching rib with an accurate height corresponding to its predetermined design is here provided. And, the probably formed roughness structure is removed to the auxiliary structure of the present touching rib. The auxiliary structure is shorter than the main body of the touching rib and cannot touch the electronic switch. Hence, an input unit according to the present invention, which has an accurate height and a smooth surface to touch the electronic switch, can constantly work as its predetermined function.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

We claim:

1. A touching rib of an input unit, the input unit comprising said touching rib and a pressing portion including a top face and a bottom face, the touching rib comprising:
    a main body, for touching an electronic switch in a predetermined distance, disposed on the bottom face, wherein the main body has a first predetermined height; and
    at least one auxiliary structure, formed integrally with the main body and disposed on the bottom face and side by side with the main body, wherein the auxiliary structure has a second predetermined height shorter than the first predetermined height.

2. The touching rib according to claim 1, wherein the auxiliary structure has a shape of column.

3. The touching rib according to claim 1, wherein the main body and the at least one auxiliary structure are formed integrally by plastic material.

4. The touching rib according to claim 1, wherein a cross section of the main body has a shape of T.

5. The touching rib according to claim 1, wherein a cross section of the main body has a shape of cross.

6. A touching rib of an input unit, the input unit comprising said touching rib and a pressing portion including a top face and a bottom face, the touching rib comprising:
    a main body, for touching an electronic switch in a predetermined distance, disposed on the bottom face, wherein the main body has a first predetermined height; and
    at least one auxiliary structure, formed integrally with the main body and disposed on the bottom face and side by side with the main body, wherein the auxiliary structure has a second predetermined height shorter than the first predetermined height,
    wherein the auxiliary structure is needed for maintaining the main body having an accurate height, which is corresponding to the first predetermined height, and a smooth surface for touching the electronic surface, during the fabrication process.

7. The touching rib according to claim 6, wherein the auxiliary structure has a shape of column.

8. The touching rib according to claim 6, wherein the main body and the at least one auxiliary structure are formed integrally by plastic material.

9. The touching rib according to claim 6, wherein a cross section of the main body has a shape of T.

10. The touching rib according to claim 6, wherein a cross section of the main body has a shape of cross.

* * * * *